US008854848B1

(12) United States Patent
Chen et al.

(10) Patent No.: US 8,854,848 B1
(45) Date of Patent: Oct. 7, 2014

(54) POWER SUPPLYING DEVICE HAVING PROGRAMMABLE CURRENT-BALANCING CONTROL

(71) Applicant: Etasis Electronics Corporation, New Taipei (TW)

(72) Inventors: Hsin-Hung Chen, New Taipei (TW); Yu-Hung Lin, New Taipei (TW)

(73) Assignee: Etasis Electronics Corporation, New Taipei (TW)

( * ) Notice: Subject to any disclaimer, the term of this patent is extended or adjusted under 35 U.S.C. 154(b) by 0 days.

(21) Appl. No.: 14/013,179

(22) Filed: Aug. 29, 2013

(51) Int. Cl.
H02M 3/157 (2006.01)
(52) U.S. Cl.
USPC ................................ 363/65; 323/283; 323/285
(58) Field of Classification Search
USPC ............... 363/65–72; 323/241, 282–285, 351
See application file for complete search history.

(56) References Cited

U.S. PATENT DOCUMENTS 8,076,916 B2 * 12/2011 Yu et al. .................. 323/282
8,643,354 B2 * 2/2014 Chang et al. ............. 323/285
8,675,378 B2 * 3/2014 Beland ..................... 363/71
8,730,695 B1 * 5/2014 Ludlam et al. ........... 363/65
2012/0153917 A1 * 6/2012 Adell et al. .............. 323/283

* cited by examiner

Primary Examiner — Jessica Han
(74) Attorney, Agent, or Firm — Rosenberg, Klein & Lee

(57) ABSTRACT

A power supplying device having programmable current-balancing control includes at least two power modules in parallel. Each power module includes a power convertor, a current sensing component, a tuning circuit, a current-balancing control circuit and an output voltage controller. The power convertor provides power to a load via an output end. The current sensing component senses output current of the power convertor to generate a current sensing signal. The tuning circuit generates a tuning signal according to a control signaling from a communicating port. The current-balancing control circuit receives the current sensing signal and the tuning signal. The current-balancing control circuit generates a current-balancing signal according to the current sensing signal. The current-balancing control circuit generates a voltage control signal according to the tuning signal. The output voltage controller tunes an output voltage of the power convertor according to the current-balancing signal or the voltage control signal.

10 Claims, 8 Drawing Sheets

POWER SUPPLYING DEVICE HAVING PROGRAMMABLE CURRENT-BALANCING CONTROL

BACKGROUND

1. Technical Field

The present disclosure relates to a power supplying device, in particular, to a power supplying device having programmable current-balancing control.

2. Description of Related Art

Referring to FIG. 1, FIG. 1 is a circuit block diagram illustrating a conventional backup power supplying device. The backup power supplying device 1 comprises more than two power modules (11 and 12). FIG. 1 is an example of two power modules. Each of the power modules 11 (or 12) comprises a power convertor 111 (or 121), a current sensing component 112 (or 122), a current-balancing control circuit 113 (or 123), a switch 115 (or 125) and an output voltage controller 114 (or 124). In the conventional backup power supplying device 1, in order to jointly share the output power outputting to a load 13, there are at least two power modules for jointly providing the power needed by the load 13 in one system so that when any one of the power modules is interrupted abnormally, the other power module which can operate normally may keep provide power to the load 13 to meet the demand for uninterruptable power supply.

Based on active type current-balancing control, the current sensing component (112 or 122) senses the output current of the power module (11 or 12). A communicating wire 14 transmits the current-balancing voltage signal to the comparator circuit and the error amplifier circuit inside the current-balancing control circuit (113 or 123) of the other power module (12 or 11) for proceeding operation to get an amplifying gain value. The amplifying gain value is transmitted to the feedback end of the output voltage controller 114 to accomplish tuning voltage control. For example, a 100 ampere (A) system requiring load can be controlled by the current-balancing control circuits to accomplish 50%:50% ratio, which means the output current of each power module is 50 A.

SUMMARY

An exemplary embodiment of the present disclosure provides a power supplying device having programmable current-balancing control which can tune the output voltage of each of the power modules so as to tune the load ration of the power modules.

In an exemplary embodiment of the present disclosure, the above mentioned power supplying device having programmable current-balancing control comprises at least two power modules in parallel. The power modules output power to a load in parallel with each other. Each power module comprises a power convertor, a current sensing component, a tuning circuit, a current-balancing control circuit and an output voltage controller. The power convertor has an output end. The power convertor provides power to the load via the output end. The current sensing component couples to the output end of the power convertor and senses output current of the power convertor to generate a current sensing signal. The tuning circuit has a communicating port and generates a tuning signal according to a control signaling from the communicating port. The current-balancing control circuit couples to the current sensing component and the tuning circuit and receives the current sensing signal and the tuning signal. When the current-balancing control circuit does not receive the tuning signal, the current-balancing control circuit generates a current-balancing signal according to the current sensing signal. When the current-balancing control circuit receives the tuning signal, the current-balancing control circuit generates a voltage control signal according to the tuning signal. The output voltage controller couples to the current-balancing control circuit and tunes an output voltage of the power convertor according to the current-balancing signal or the voltage control signal. The current-balancing control circuits of the power modules couple with each other via a communicating wire.

In an exemplary embodiment of the present disclosure, the above mentioned tuning circuit further comprises a potential tuning circuit and a microprocessor. The potential tuning circuit couples to the current-balancing control circuit and generates the tuning signal. The microprocessor couples to the potential tuning circuit. The microprocessor comprises the communicating port. The microprocessor controls the potential tuning circuit to generate the tuning signal according to the control signaling.

In an exemplary embodiment of the present disclosure, the power module is an AC/DC power module or a DC/DC power module.

In an exemplary embodiment of the present disclosure, the above mentioned communicating port is an Inter-Integrated Circuit Bus (I²C-Bus) or a Power Management Bus (PMBus).

In an exemplary embodiment of the present disclosure, the above mentioned power supplying device having programmable current-balancing control further comprises a switch which couples between the current sensing component and the load.

In an exemplary embodiment of the present disclosure, the above mentioned output voltage controller is a pulse width modulation controller or a linear voltage modulation controller.

In an exemplary embodiment of the present disclosure, the above mentioned potential tuning circuit comprises a variable resistance component.

In an exemplary embodiment of the present disclosure, the above mentioned current-balancing control circuit generates the voltage control signal according to the tuning signal to tune pulse width generated from the pulse width modulation controller.

In an exemplary embodiment of the present disclosure, the load ratio of the above mentioned power modules is tunable.

In an exemplary embodiment of the present disclosure, the above mentioned tuning circuit increases or decreases the output voltage of the power convertor step by step.

To sum up, the exemplary embodiment of the present disclosure provides a power supplying device having programmable current-balancing control which controls the load ratio of each power module to tune the life time of the power modules so as to arrange the replacing period and the replacing rate of the power modules.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
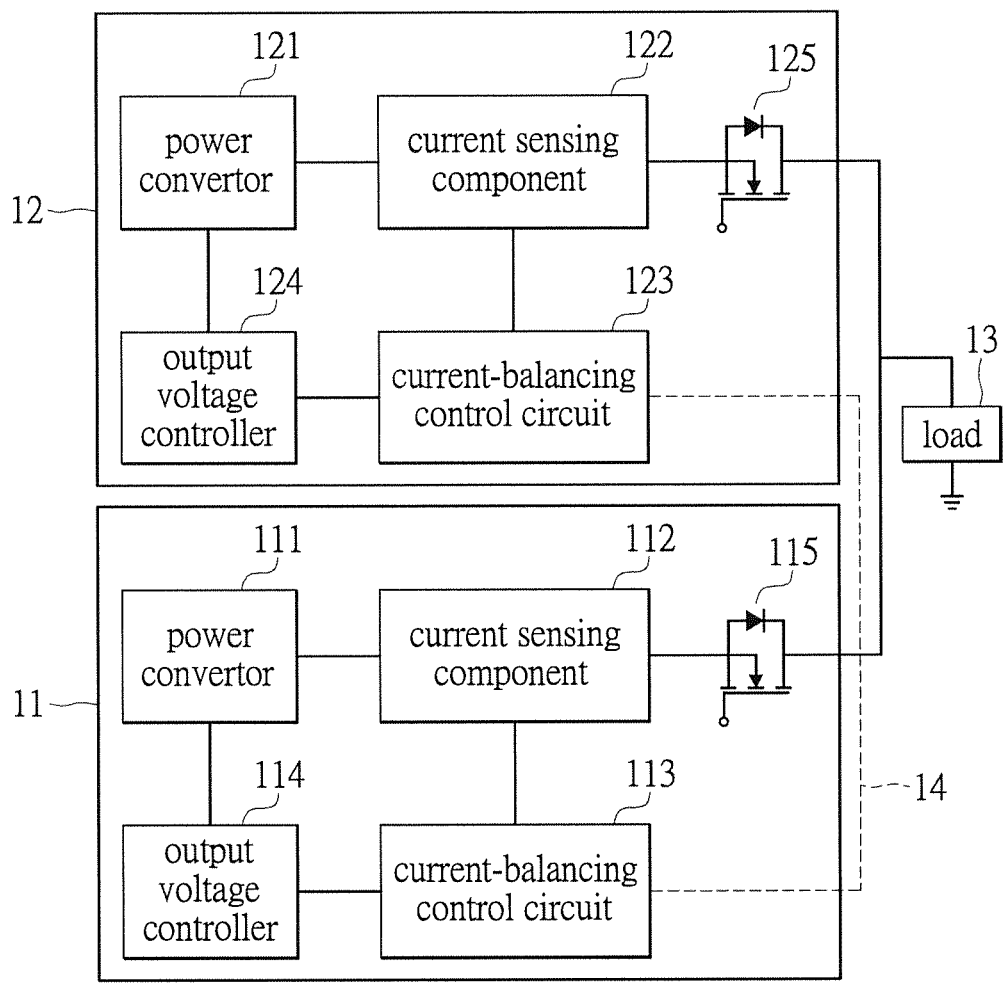
FIG. 1 is a circuit block diagram illustrating a conventional backup power supplying device.
Figure 2:
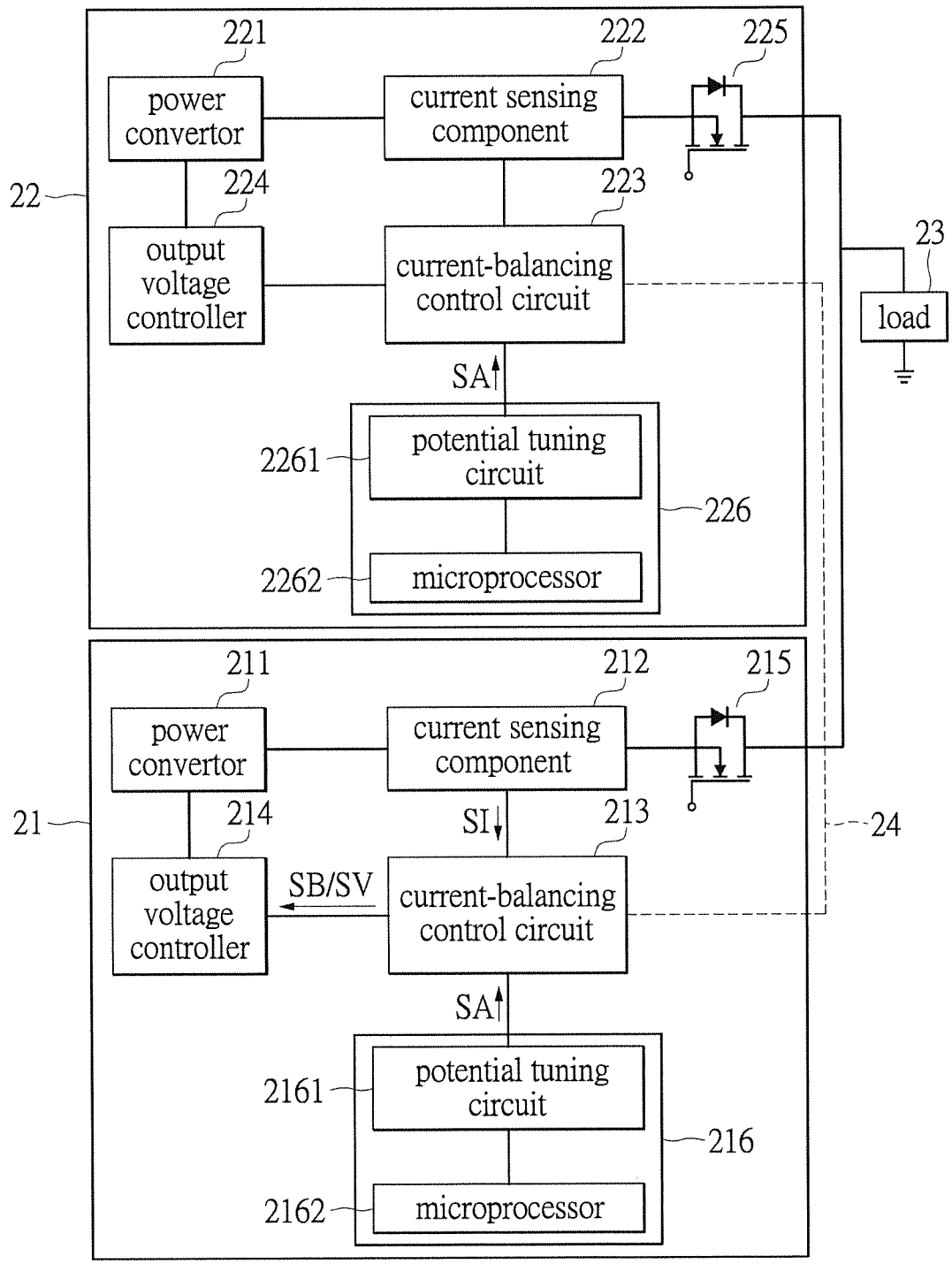
FIG. 2 is a circuit block diagram illustrating a power supplying device having programmable current-balancing control in an embodiment of the present disclosure.

Referring to FIG. 2, FIG. 2 is a circuit block diagram illustrating a power supplying device having programmable current-balancing control in an embodiment of the present disclosure. The power supplying device having programmable current-balancing control 2 comprises at least two power modules in parallel. FIG. 2 is an example of two power modules 21 and 22 for illustration. The load ratio of the power modules 21 and 22 is tunable. The power modules 21 and 22 output power to a load 23 in parallel with each other. The power module 21 comprises a power convertor 211, a current sensing component 212, a tuning circuit 216, a current-balancing control circuit 213, an output voltage controller 214 and a switch 215. The power module 22 comprises a power convertor 221, a current sensing component 222, a tuning circuit 226, a current-balancing control circuit 223, an output voltage controller 224 and a switch 225.

The power convertor 211 (or 221) has an output end. The power convertor 211 (or 221) provides power to the load 23 via the output end. The current sensing component 212 (or 222) couples to the output end of the power convertor 211 (or 221). The current sensing component 212 (or 222) senses the output current of the power convertor 211 (or 221) to generate a current sensing signal SI. The switch 215 (or 225) couples between the current sensing component 212 (or 222) and the load 23. The tuning circuit 216 (or 226) has a communicating port and generates a tuning signal SA according to a control signaling from the communicating port (the digital communication as showed in FIG. 3). The current-balancing control circuit 213 (or 223) couples to the current sensing component 212 (or 222) and the tuning circuit 216 (or 226) and receives the current sensing signal SI and the tuning signal SA. The output voltage controller 214 (or 224) couples to the current-balancing control circuit and the power convertor 211 (or 221).

The operation of the current-balancing control circuit 213 will be described thereinafter. The operation of the current-balancing control circuit 223 is the same and will not be further described. When the current-balancing control circuit 213 does not receive the tuning signal SA, the current-balancing control circuit 213 generates a current-balancing signal SB according to the current sensing signal SI. When the current-balancing control circuit 213 receives the tuning signal SA, the current-balancing control circuit 213 generates a voltage control signal SV according to the tuning signal SA. The output voltage controller 214 tunes an output voltage of the power convertor 211 according to the current-balancing signal SB or the voltage control signal SV. The current-balancing control circuits 213 and 223 of the power modules 21 and 22 couple with each other via a communicating wire 24.

Referring to FIG. 2 again, the tuning circuit 216 (or 226) comprises a potential tuning circuit 2161 (or 2261) and a microprocessor 2162 (or 2262). Taking the potential tuning circuit 2161 as an example for illustration, the potential tuning circuit 2161 couples to the current-balancing control circuits 213 and generates the tuning signal SA. The microprocessor 2162 comprises a communication port. The microprocessor 2162 controls the potential tuning circuit 2161 according to the control signaling from the communication port so as to make the potential tuning circuit 2161 generate the tuning signal SA. The control signaling can be a digital communication signal from external computer or controller. The digital communication signal can received from the communication port such as an Inter-Integrated Circuit Bus ($I^2C$-Bus) or a Power Management Bus (PMBus). However, the communication port for receiving digital communication by the potential tuning circuit, the format of the control signaling or the signal standard are not intended to limit the scope of the present disclosure.

Figure 3:
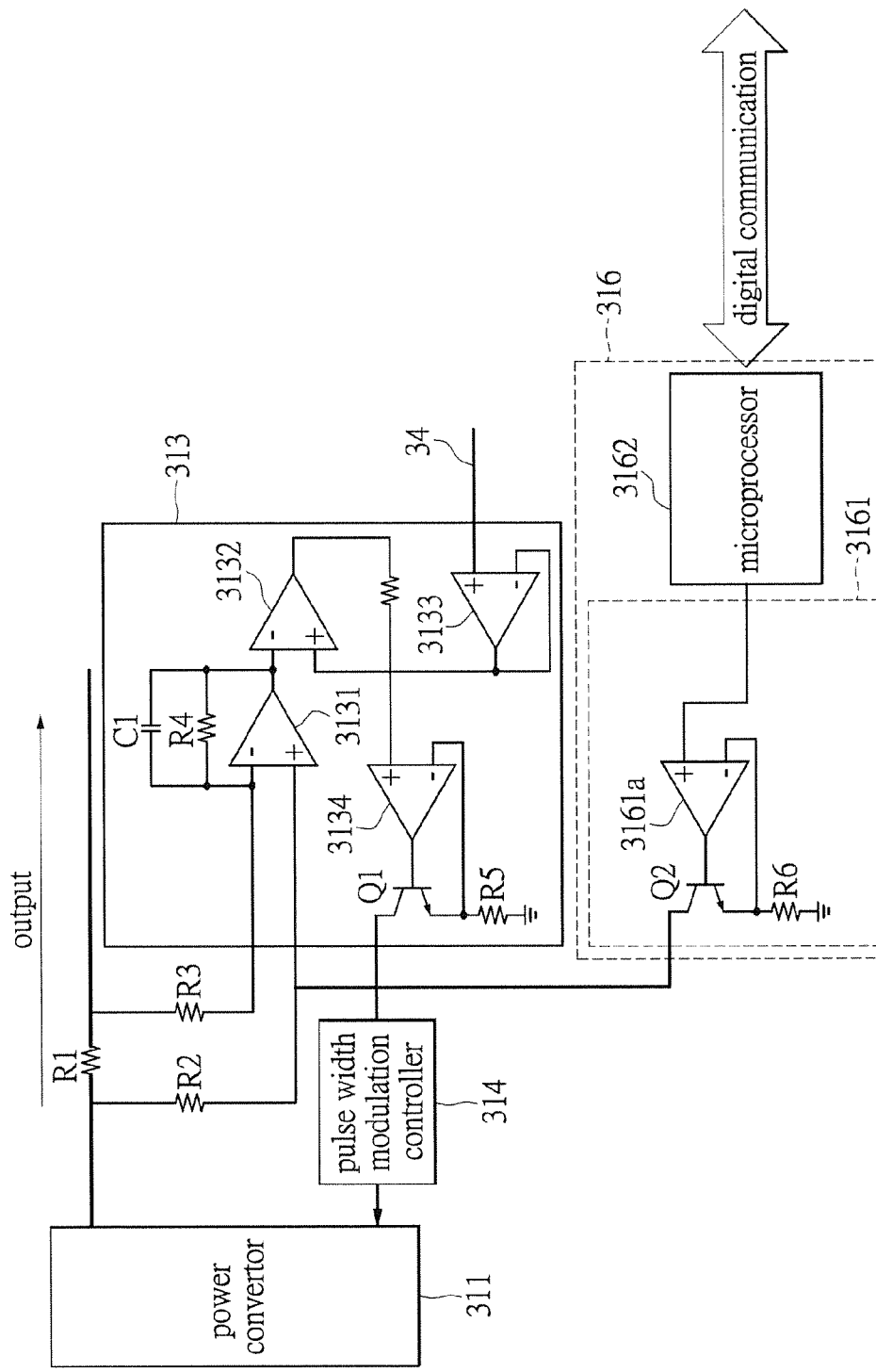
FIG. 3 is a circuit diagram illustrating a current-balancing control circuit and a tuning circuit in an embodiment of the present disclosure.

Referring to FIG. 2 and FIG. 3 in the meanwhile, FIG. 3 is a circuit diagram illustrating a current-balancing control circuit and a tuning circuit in an embodiment of the present disclosure. The power converter 311 in FIG. 3 and the power converter 111 in FIG. 2 are the same. The pulse width modulation controller 314 in FIG. 3 is one of the implementations of the output voltage controller 114 in FIG. 2. The implementation is not intended to limit the scope of the present disclosure. The output voltage controller 114 of the present disclosure can be a pulse width modulation controller or a linear voltage modulation controller. The power converter 111 can be an AC/DC power module or a DC/DC power module. Since the current provided to the load 13 is DC, the pulse width modulation controller 314 is a commonly used controller for a person skilled in the art and will not be further described herein. The current-balancing control circuit 313 in FIG. 3 is one of the implementations of the current-balancing control circuit 213 in FIG. 2. The implementation is merely an example used for illustration and is not intended to limit the scope of the present disclosure. The tuning circuit 316 in FIG. 3 comprises a potential tuning circuit 3161 and a microprocessor 3162.

Referring to FIG. 3 again, the current-balancing control circuit 313 is composed of amplifiers 3131, 3132, 3133, 3134, a transistor Q1, a capacitor C1, resistors R4 and R5. The current sensing component 212 in FIG. 2 is composed of resistors R1, R2 and R3. The implementation is not intended to limit the scope of the present disclosure. The integrator is composed of the amplifier 3131, the capacitor C1 and the resistor R4. The integrator integrates the current passing through the resistor R1 and transmits the integrated current signal (in voltage form) to the inverting input end (−) of the amplifier 3132. The inverting input end (−) of the amplifier 3133 couples to the output end to form a unit gain follower. The amplifier 3133 transmits the current-balancing signal on the communicating wire 34 to the non-inverting input end (+) of the amplifier 3132. The amplifier 3132 in FIG. 3 forms a comparator circuit structure which compares the integrated current signal with the current-balancing signal. The compared result is transmitted to the non-inverting input end (+) of the amplifier 3134. The inverting input end (−) of the amplifier 3134 couples to the ground via the resistor R5. The output end of the amplifier 3134 couples to the control end (base) of the transistor Q1 to control conducting status (ON or OFF) of the transistor Q1. The transistor Q1 couples between the pulse width modulation controller 314 and the resistor R5 (by coupling the emitter to the resistor R5 and coupling the collector to the pulse width modulation controller 314). The amplifier 3134 controls ON and OFF of the transistor Q1 according to the compared result of the amplifier 3132 so as to generate the voltage control signal SV for tuning the pulse width generated from the pulse width modulation controller 314. For example, when the integrated current signal representing the current passing through the resistor R1 less than the current-balancing signal from the communicating wire 34, the transistor Q1 is ON. The pulse width modulation controller 314 can increase the pulse width accordingly to increase the output voltage and current of the power convertor 311. When the integrated current signal representing the current passing through the resistor R1 greater than the current-balancing signal from the communicating wire 34, the transistor Q1 is OFF. The pulse width modulation controller 314 can decrease the pulse width accordingly to decrease the output voltage and current of the power convertor 311.

Referring to FIG. 3 again, the potential tuning circuit 3161 tunes the potential the non-inverting input end (+) of the amplifier 3131 according to the control from the microprocessor 3162. The potential tuning circuit 3161 comprises an amplifier 3161a, a resistor R6 and a transistor Q2. The microprocessor 3162 controls the resistance value viewed from the current-balancing control circuit 313 (the resistance value of the collector of the transistor Q2) according to the signal from the digital communication (e.g., the signal from the I²C-Bus). The collector of the transistor Q2 couples to the resistor R2 and the non-inverting input end (+) of the amplifier 3131. The potential of the non-inverting input end (+) of the amplifier 3131 can be changed by the variant resistance value of the potential tuning circuit 3161 so as to change the current signal integrated by the amplifier 3131, and thus the pulse width of the pulse width modulation controller 314 can be tuned accordingly. The potential of the connecting point between the potential tuning circuit 3161 and the current-balancing control circuit 313 represents the tuning signal SA in FIG. 2. However, the implementation of the potential tuning circuit 3161 is not intended to limit the scope of the present disclosure. The potential tuning circuit 3161 may comprises a variable resistance component. The microprocessor 3162 may control the resistance value of the variable resistance component. The above mentioned amplifier 3161a, resistor R6 and transistor Q2 may equivalent to the variable resistance component.

Referring to FIG. 2 again, the output current of the power module can be changed by the tuning signal SA generated from the tuning circuit 216 so that the output current ratio of the power modules 21 and 22 can be different. For example, the output current ration of the power modules 21 and 22 can be 40%:60% or 70%:30% or even can be the complete backup state of 100%:0% that the power module 22 does not output current and the power module 22 is the backup power module.

Figure 4:
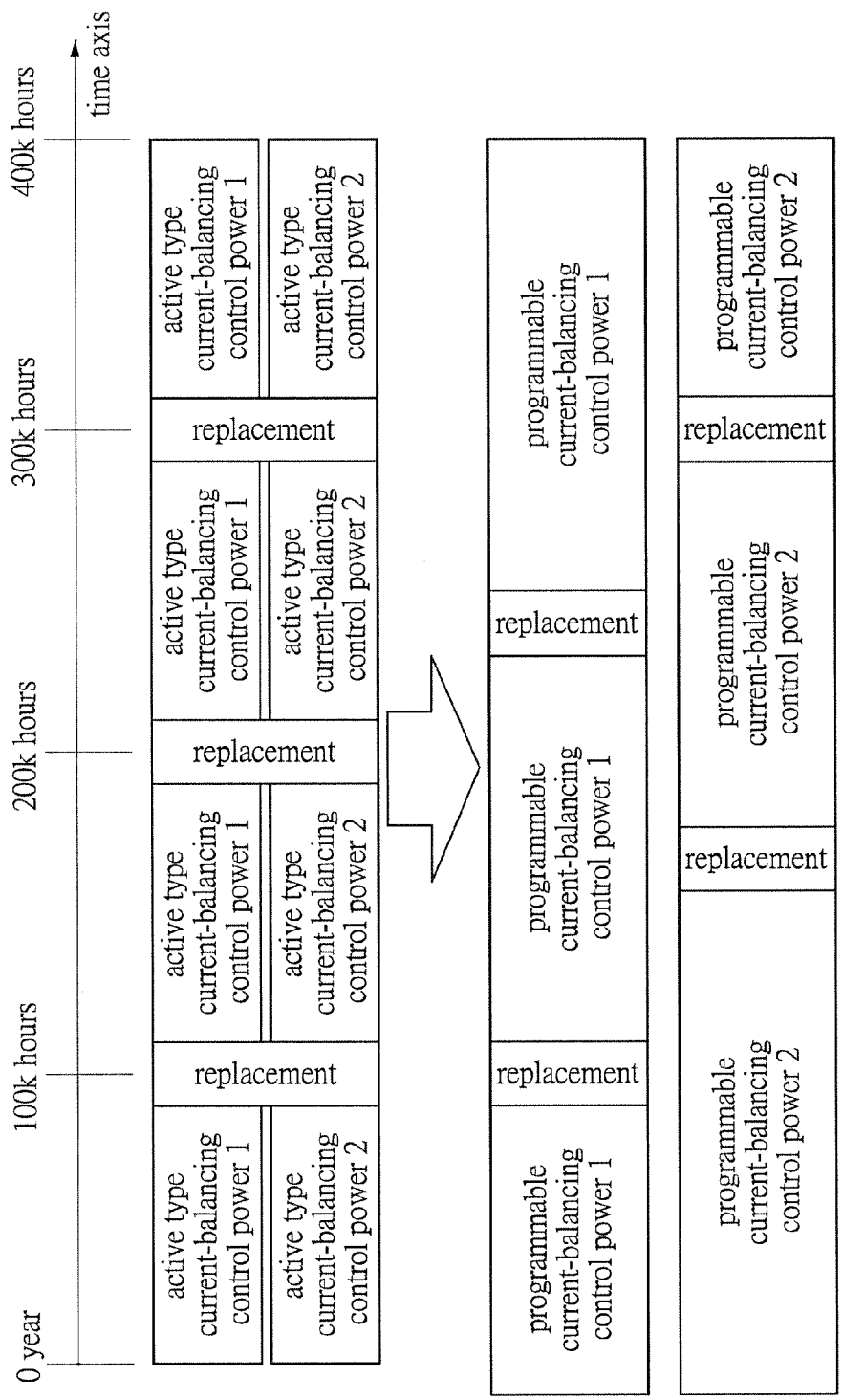
FIG. 4 is a schematic diagram illustrating the replacing time interval of the power modules in an embodiment of the present disclosure.

Referring to FIG. 4, FIG. 4 is a schematic diagram illustrating the replacing time interval of the power modules in an embodiment of the present disclosure. By tuning of the tuning circuit 216 in FIG. 2, the life time of the power modules may be easily expected and the replacing rate of the power modules may also be estimated. In the conventional active type current-balancing power supplying device, since the output power ratio of the power modules (the active type current-balancing control power 1 or the active type current-balancing control power 2) are equal, it may likely cause the replacement for all power modules at the same time. For example, at the power replacing time point of 100 k hours, 200 k hours, 300 k hours and 400 k hours, since the power modules would fail easily after the expected life time, all power modules have to be replaced at the same time point to avoid the possibility of failure of any one of the power modules. However, the programmable current-balancing control power (i.e., the power supplying device having programmable current-balancing control) can tune the expected life time of each power module by the power providing ratio of each power module. The power module with low power providing rate may has longer expected life time. The power module with high power providing rate may has shorter expected life time. Accordingly, the expected lift time of each power module can be different and the replacing time of the power modules may also be estimated. In FIG. 4, within the 400 k hours using period, the total using amount of the programmable current-balancing control power 1 and the programmable current-balancing control power 2 is 6 and the total using amount of the conventional active type current-balancing control power 1 and 2 is 8. Therefore, in using amount of the power modules, the amount of the power modules needing to be replaced can be reduced in the present disclosure. The expected life time of each power module expires at different time in the present disclosure so as to avoid the possibility that the conventional active type current-balancing control powers will fail at the same time.

Figure 5:
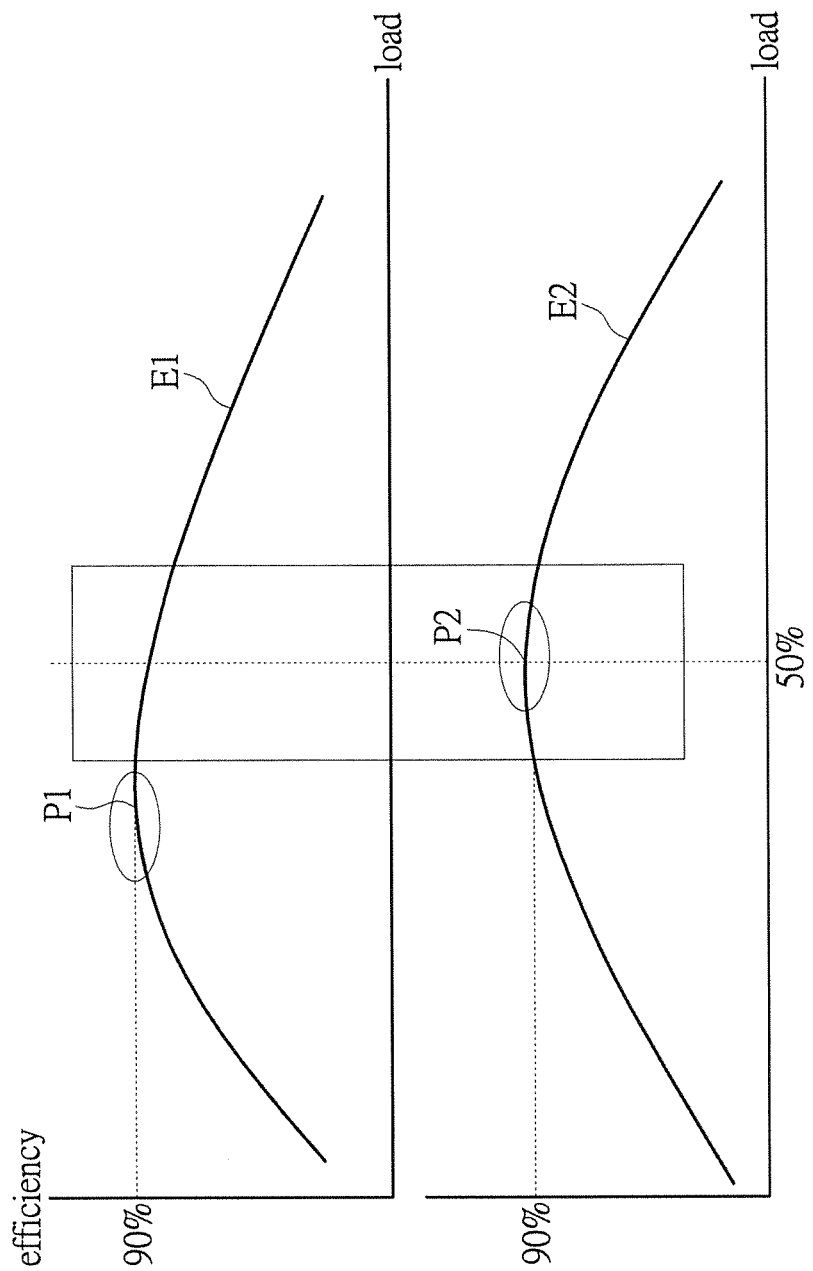
FIG. 5 is a schematic diagram illustrating the converting efficiency of the power module of a conventional active type current-balancing power supplying device.

Referring to FIG. 5, FIG. 5 is a schematic diagram illustrating the converting efficiency of the power module of a conventional active type current-balancing power supplying device. Each power module of the conventional active type current-balancing power supplying device operates at the same output current. Thus the power modules with different converting efficiency may operate at different converting rate when they operate at the same output current. The most efficient point P1 and P2 of the converting efficiency curve E1 and E2 are not at the same output current (or load ratio). The current-balancing control circuit of each power module controls the output current of each power module to be identical. As illustrated in FIG. 5 that the output current ratio (i.e., load ratio) is 50%:50%.

Figure 6:
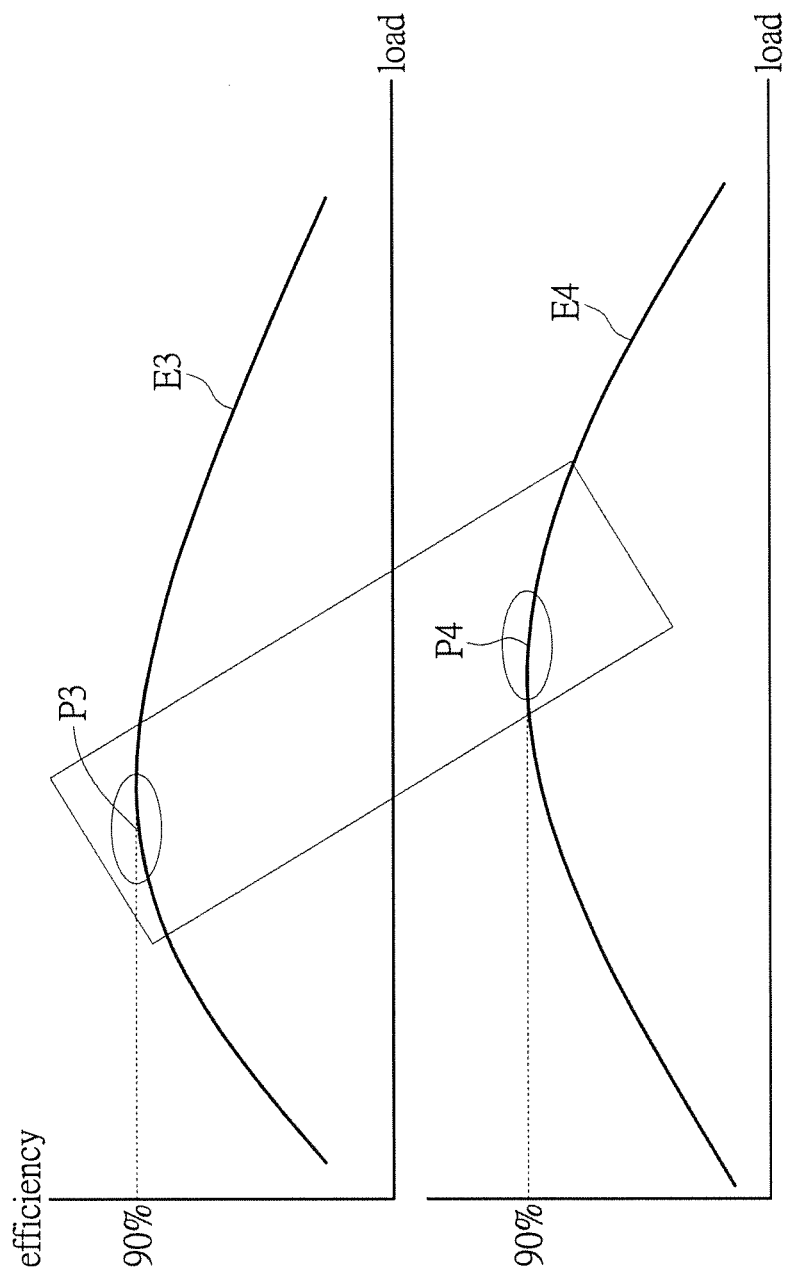
FIG. 6 is a schematic diagram illustrating the converting efficiency of the power module of a power supplying device having programmable current-balancing control in an embodiment of the present disclosure.

Referring to FIG. 6, FIG. 6 is a schematic diagram illustrating the converting efficiency of the power module of a power supplying device having programmable current-balancing control in an embodiment of the present disclosure. The load ratio of the power modules in the present disclosure is tunable. For example, the load ratio can be tuned to 40%:60% so that the two power modules can operate at the most efficient point P3 and P4 of the converting efficiency curve E3 and E4 respectively.

Figure 7:
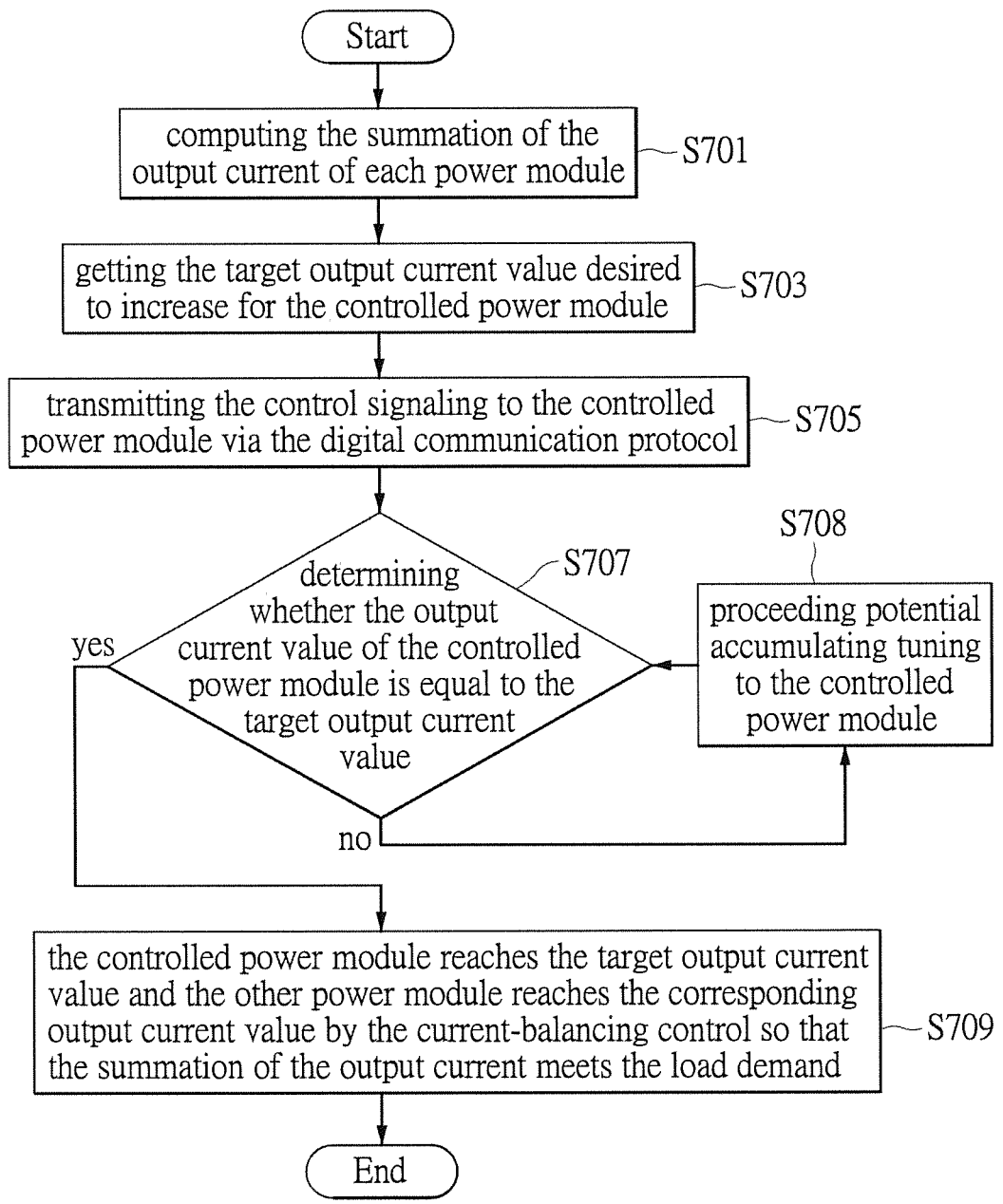
FIG. 7 is an operation flow chart of a power supplying device having programmable current-balancing control in an embodiment of the present disclosure.

Referring to FIG. 2 and FIG. 7 in the meanwhile, FIG. 7 is an operation flow chart of a power supplying device having programmable current-balancing control in an embodiment of the present disclosure. If the output current (or load ratio) of a power module needs to be increased, the power module is arranged to be a controlled power module and the control signaling is transmitted to the tuning circuit (e.g. the microprocessor of the tuning circuit) of the controlled power module via the digital communication. Firstly, the step S701 is to compute the summation of the output current of each power module. Then, the step S703 is to get the target output current value desired to increase for the controlled power module. Next, the step S705 is to transmit the control signaling to the controlled power module via the digital communication protocol, i.e., to transmit the control signaling to the tuning circuit 216 (or 226) in FIG. 2. Then, the step S707 is to determine whether the output current value of the controlled power module 21 (or 22) is equal to the target output current value. When the output current value of the controlled power module 21 (or 22) does not equal to the target output current value, the step S708 is executed. The step S708 is to proceed potential accumulating tuning to the controlled power module. The step S708 can be executed iteratively to proceed potential accumulating tuning. An example of potential accumulating tuning is that the potential tuning circuit 3161 of the tuning circuit 316 in FIG. 3 increases the potential of the non-inverting input end (+) of the amplifier 3131 successively. Accordingly, the tuning circuit 216 in FIG. 2 may increase the output voltage of the power converter 211 successively. It should be mentioned that the above mentioned accumulating tuning method by increasing potential successively may also be replaced by tuning the potential at once so that the procedure of increasing the output current (or load ratio) of the power module can be reached at once. The number of times for potential tuning is not intended to limit the scope of the present disclosure.

When the output current value of the controlled power module 21 (or 22) equals to the target output current value, the step S709 is executed. In the step S709, the controlled power module reaches the target output current value and the other power module reaches the corresponding output current value by the current-balancing control so that the summation of the output current meets the load demand.

Figure 8:
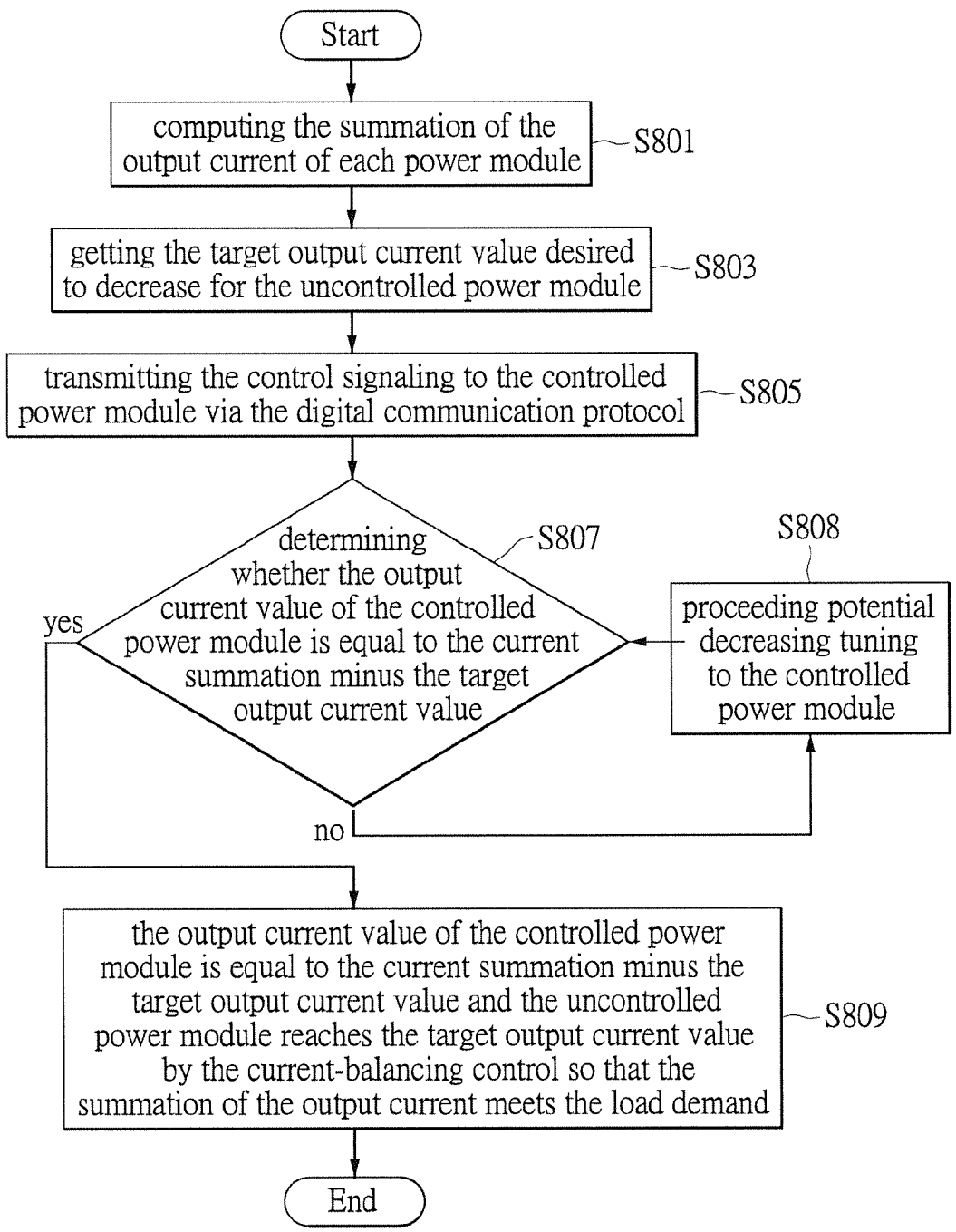
FIG. 8 is an operation flow chart of a power supplying device having programmable current-balancing control in another embodiment of the present disclosure.

Referring to FIG. 2 and FIG. 8 in the meanwhile, FIG. 8 is an operation flow chart of a power supplying device having programmable current-balancing control in another embodiment of the present disclosure. Under the condition of two power modules in parallel, if the output current of one power module (e.g., power module 21) needs to be decreased, the other power module (e.g., power module 22) is arranged to be a controlled power module and the control signaling is transmitted to the tuning circuit (e.g. the microprocessor of the tuning circuit) of the controlled power module via the digital communication. Firstly, the step S801 is to compute the summation of the output current of each power module. Then, the step S803 is to get the target output current value desired to decrease for the uncontrolled power module (21). Next, the step S805 is to transmit the control signaling to the controlled power module (22) via the digital communication protocol. Then, the step S807 is to determine whether the output current value of the controlled power module 22 is equal to the current summation minus the target output current value. When the output current value of the controlled power module 21 (or 22) does not equal to the current summation minus the target output current value, the step S808 is executed. The step S808 is to proceed potential decreasing tuning to the controlled power module (22). The step S808 can be executed iteratively to proceed potential decreasing tuning. An example of potential decreasing tuning is that the potential tuning circuit 3161 of the tuning circuit 316 in FIG. 3 decreases the potential of the non-inverting input end (+) of the amplifier 3131 successively. Accordingly, the tuning circuit 216 in FIG. 2 may decrease the output voltage of the power converter 211 successively. It should be mentioned that the above mentioned decreasing tuning method by decreasing potential successively may also be replaced by tuning the potential at once so that the procedure of decreasing the output current (or load ratio) of the power module can be reached at once. The number of times for potential tuning is not intended to limit the scope of the present disclosure.

When the output current value of the controlled power module 22 equals to the current summation minus the target output current value, the step s809 is executed. In the step s809, the output current value of the controlled power module (22) is equal to the current summation minus the target output current value and the uncontrolled power module (21) reaches the target output current value by the current-balancing control so that the summation of the output current meets the load demand.

According to the above descriptions, a power supplying device having programmable current-balancing control is provided in the present disclosure. The power supplying device with programmable current-balancing control can tune the life time of the power modules by controlling the load ratio of each power module so as to arrange the replacing period and the replacing rate of the power modules.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A power supplying device having programmable current-balancing control, comprising:
　　at least two power modules; the power modules output power to a load in parallel with each other; each of the power modules comprises:
　　　　a power convertor, having an output end; the power convertor provides power to the load via the output end;
　　　　a current sensing component, coupling to the output end of the power convertor, sensing output current of the power convertor to generate a current sensing signal;
　　　　a tuning circuit, having a communicating port, generating a tuning signal according to a control signaling from the communicating port;
　　　　a current-balancing control circuit, coupling to the current sensing component and the tuning circuit, receiving the current sensing signal and the tuning signal, wherein when the current-balancing control circuit does not receive the tuning signal, the current-balancing control circuit generates a current-balancing signal according to the current sensing signal, and when the current-balancing control circuit receives the tuning signal, the current-balancing control circuit generates a voltage control signal according to the tuning signal; and
　　　　an output voltage controller, coupling to the current-balancing control circuit, tuning an output voltage of the power convertor according to the current-balancing signal or the voltage control signal;
　　wherein the current-balancing control circuits of the power modules coupling with each other via a communicating wire.

2. The power supplying device having programmable current-balancing control as claimed in claim 1, wherein the tuning circuit further comprises:
　　a potential tuning circuit, coupling to the current-balancing control circuit, generating the tuning signal; and a microprocessor, coupling to the potential tuning circuit;
the microprocessor comprises the communicating port;
the microprocessor controls the potential tuning circuit to generate the tuning signal according to the control signaling.

3. The power supplying device having programmable current-balancing control as claimed in claim 2, wherein the output voltage controller is a pulse width modulation controller or a linear voltage modulation controller.

4. The power supplying device having programmable current-balancing control as claimed in claim 3, wherein the current-balancing control circuit generates the voltage control signal according to the tuning signal to tune pulse width generated from the pulse width modulation controller.

5. The power supplying device having programmable current-balancing control as claimed in claim 2, wherein the potential tuning circuit comprises a variable resistance component.

6. The power supplying device having programmable current-balancing control as claimed in claim 2, wherein the tuning circuit increases or decreases the output voltage of the power convertor step by step.

7. The power supplying device having programmable current-balancing control as claimed in claim 1, wherein the power module is an AC/DC power module or a DC/DC power module.

8. The power supplying device having programmable current-balancing control as claimed in claim 1, wherein the communicating port is an Inter-Integrated Circuit Bus ($I^2C$-Bus) or a Power Management Bus (PMBus).

9. The power supplying device having programmable current-balancing control as claimed in claim 1, further comprising a switch, coupling between the current sensing component and the load.

10. The power supplying device having programmable current-balancing control as claimed in claim 1, wherein load ratio of the power modules is tunable.

* * * * *